(12) United States Patent
Downer et al.

(10) Patent No.: US 7,194,585 B2
(45) Date of Patent: Mar. 20, 2007

(54) COHERENCY CONTROLLER MANAGEMENT OF TRANSACTIONS

(75) Inventors: Wayne A. Downer, Portland, OR (US); Donald R. DeSota, Portland, OR (US); Thomas D. Lovett, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 10/739,698

(22) Filed: Dec. 18, 2003

(65) Prior Publication Data

US 2005/0138299 A1     Jun. 23, 2005

(51) Int. Cl.
*G06F 12/00*     (2006.01)

(52) U.S. Cl. .................................................. 711/141

(58) Field of Classification Search ............ None
See application file for complete search history.

(56) References Cited

U.S. PATENT DOCUMENTS

| | | | |
|---|---|---|---|
| 6,378,029 B1 * | 4/2002 | Venkitakrishnan et al. | 710/317 |
| 6,859,864 B2 * | 2/2005 | Khare et al. | 711/146 |
| 6,920,581 B2 * | 7/2005 | Bigbee et al. | 714/10 |
| 2004/0088523 A1 * | 5/2004 | Kessler et al. | 712/29 |

\* cited by examiner

*Primary Examiner*—Hyund Sough
*Assistant Examiner*—Duc T. Doan
(74) *Attorney, Agent, or Firm*—Abdy Raissinia (57) ABSTRACT

The management of transactions received by a coherency controller is disclosed. A method of an embodiment of the invention is performed by a coherency controller of a plurality of coherency controllers of a node that has a plurality of sub-nodes. The coherency controller receives a transaction from one of the sub-nodes of the node. The transaction may relate to another sub-node of the node. However, the coherency controller nevertheless processes the transaction without having to send the transaction to another coherency controller of the node, even though the sub-node from which the transaction was received is different than the sub-node to which the transaction relates. The plurality of coherency controllers is thus shared by all of the plurality of sub-nodes of the node.

17 Claims, 4 Drawing Sheets

COHERENCY CONTROLLER MANAGEMENT OF TRANSACTIONS

BACKGROUND OF THE INVENTION

1. Technical Field

This invention relates generally to a multiple-node system having a number of communicatively connected nodes, and more particularly to coherency controllers of each node.

2. Description of the Prior Art

There are many different types of multi-processor computer systems. A Symmetric Multi-Processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system. The operating system uses the processors as a pool of processing resources, all executing simultaneously, where each processor either processes data or is in an idle loop waiting to perform a task. SMP systems increase in speed whenever processes can be overlapped.

A Massively Parallel Processor (MPP) system can use thousands or more processors. MPP systems use a different programming paradigm than the more common SMP systems. In an MPP system, each processor contains its own memory and a copy of the operating system and application, or a portion of the application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A Non-Uniform Memory Access (NUMA) system is a multi-processing system in which memory is separated into distinct banks. NUMA systems are a type of SMP systems. In SMP systems, however, all processors access a common memory at the same speed. By comparison, in a NUMA system, memory on the same processor board or in the same building block or node, as the processor is accessed faster than memory on other processor boards, or in other building blocks or nodes. That is, local memory is accessed faster than distant shared memory. NUMA systems generally scale better to higher numbers of processors than SMP systems.

Each node of a multiple-node system may have one or more controllers that are responsible for managing transactions. For instance, in a NUMA system, the controllers of each node are coherency controllers that are responsible for managing transactions that relate to the local memory of the node, as well as transactions that relate to the local memories of other nodes, which are considered remote memory to the node. Whereas this configuration is operable where each node is partitionable to no more than a single partition, for other configurations, where each physical node encompasses two or more sub-nodes, the coherency controllers of a given physical node may need to process a transaction once for the sending sub-node and once for the receiving sub-node when transactions relate to memory that is local to the physical node but not to the sub-node sending the transaction.

Typically, each sub-node within a physical node has a coherency controller that is responsible for the local memory of the sub-node and memory that is remote to the sub-node. When a transaction relates to memory that is local to the physical node, but not to the immediate sub-node sending the transaction, the transaction is thus processed as a remote transaction by the coherency controller local to the sub-node sending the transaction. The transaction is thus sent to the coherency controller local to the other sub-node that is responsible for the memory that is local to the physical node but not to the sub-node sending the transaction. Such a transaction, then, is processed by two difference coherency controllers local to the physical node. This incurs processing latency resulting from processing by two coherency controllers, which can cause performance degradation.

Alternatively, there may be one coherency controller for all the sub-nodes of a physical node, such that the transactions of all of the sub-nodes are processed by this controller. While a transaction is thus processed by only one coherency controller local to the physical node, and incurs processing latency resulting from processing by just one coherency controller, this latency is nevertheless usually larger than in the situation where there is a coherency controller for each sub-node. This is because the transactions of all the local sub-nodes of the physical node place a greater load on the sole coherency controller, resulting in greater queuing and other types of delays. For these and other reasons, therefore, there is a need for the present invention.

SUMMARY OF THE INVENTION

The invention relates to the management of transactions received by a coherency controller from local processors. A method of the invention is performed by one of a number of coherency controllers of a node that has a number of sub-nodes, which may also be referred to as logical nodes. The coherency controller receives a transaction from one sub-node of the node, where the transaction relates to another sub-node of the node. The coherency controller nevertheless processes the transaction without having to send the transaction to another coherency controller of the node, even though the sub-node from which the transaction was received is different than the sub-node to which the transaction relates. Thus, the coherency controllers of the node are shared by all of the sub-nodes of the node.

A node of the present invention includes a number of sub-nodes and a number of coherency controllers. The coherency controllers are shared among the sub-nodes, and process transactions received at least from the sub-nodes of the node. Each coherency controller is able to process the transactions received from the sub-nodes, without having to send the transactions to another coherency controller of the node, even where the transactions relate to different sub-nodes of the node as compared to the sub-nodes that generated the transactions, and from which the transactions were received. For transactions to memory that are local to the node but not to the sub-node sending the transaction, and for transactions that relate to other nodes but that are held locally in a state that does not require processing by a different node, not having to send the transactions to another coherency controller within the node means that the transactions are processed by just one coherency controller. This reduces processing latency and improves node performance.

A system of the invention includes at least one interconnect and a number of nodes connected to one another via the at least one interconnect. Each node includes a number of sub-nodes that have a number of resources divided among the sub-nodes of the node. Each node also includes a number of coherency controllers shared among the sub-nodes of the node, to process transactions received at least from the sub-nodes of the node. Each coherency controller of each node is able to process transactions received from the sub-nodes of the node, without having to send the transactions to another coherency controller of the node, even where the transactions relate to different sub-nodes than the sub-nodes that generated the transactions. Therefore, for transactions to memory that are local to a given node but not to the sub-node of the node sending the transaction, and for transactions that relate to other nodes but that are held locally in a state that does not require processing by a different node, not having to send the transactions to another coherency controller within the node means that the transactions are processed by just one coherency controller. This reduces processing latency and improves node and overall system performance.

Other features and advantages of the invention will become apparent from the following detailed description of the presently preferred embodiment of the invention, taken in conjunction with the accompanying drawings.

DESCRIPTION OF THE PREFERRED EMBODIMENT

Transaction Management by Coherency Controllers

Figure 1:
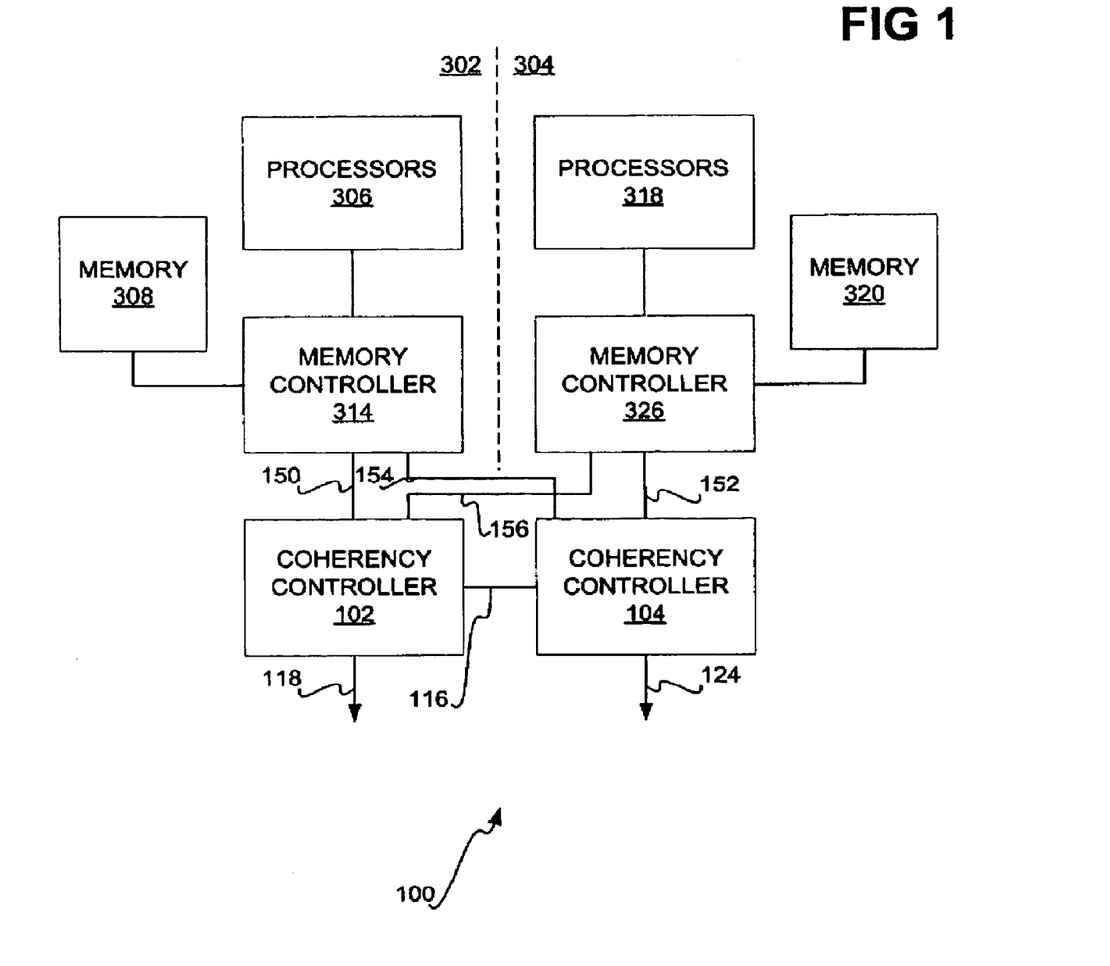
FIG. 1 is a diagram illustrating two sub-nodes of a node having local processors, memory controllers, and coherency controllers, according to an embodiment of the invention, and is suggested for printing on the first page of the patent.

FIG. 1 shows a portion of a node 100, according to an embodiment of the present invention. The node 100 may be part of a multiple-node system that includes other nodes and in which all the nodes are communicatively coupled to one another via one or more interconnects. The node 100 is divided into sub-nodes 302 and 304. The sub-nodes 302 and 304 may be referred to as logical nodes, whereas the node 100 may be referred to as a physical node. The coherency controllers 102 and 104 are shared by both of the sub-nodes 302 and 304, and are not a part of either of the sub-nodes 302 and 304. Where there are two sub-nodes 302 and 304 and two coherency controllers 102 and 104 within the node 100, this is for example purposes only. In other embodiments of the invention, there may be more than two sub-nodes within the node 100, and/or more than two coherency controllers within the node 100. Furthermore, the number of sub-nodes within the node 100 may not be equal to the number of coherency controllers within the node 100.

The sub-node 302 includes processors 306, a memory 308, and a memory controller 314. Similarly, the sub-node 304 includes processors 318, memory 320, and a memory controller 326. The controllers 102, 104, 314, and 326 may each be implemented as software, hardware, or a combination of software and hardware. For example, each of the controllers 102, 104, 314, and 326 maybe an Integrated Circuit (IC), such as an Application-Specific IC (ASIC). The memories 308 and 320 are examples of resources that are apportioned among the sub-nodes 302 and 304 of the node 100. The memories 308 and 320 are local memories in that they are local, or part of, the node 300. Furthermore, the memory 308 is local to the sub-node 302 but is remote to the sub-node 304, even though the memory 308 is local to the node 100 of which both the sub-nodes 302 and 304 are a part. Similarly, the memory 320 is local to the sub-node 304 but is remote to the sub-node 302, even though the memory 320 is local to the node 100 of which both the sub-nodes 302 and 304 are a part.

The processors 306 and 318 are able to generate transactions relating to the memories 308 and 320 that are local to the node 100, as well as transactions relating to the memory of other nodes, which is remote memory to both sub-nodes 302 and 304 of node 100. The transactions may be requests, responses, or other types of transactions. The memory controllers 314 and 326 interface the processors 306 and 318, as well as the memories 308 and 320 and the coherency controllers 102 and 104. Thus, the memory controllers 314 and 326 receive transactions from and send transactions to the processors 306 and 318, and read data from and store data to the memories 308 and 320. The memory controller 314 is specific to the sub-node 302, and thus to the processors 306 and to the memory 308 of the sub-node 302. The memory controller 326 is specific to the sub-node 304, and thus to the processors 318 and to the memory 320 of the sub-node 304.

The coherency controllers 102 and 104 are each designed to process the transactions that relate to local memories 308 and 320 of the node 100, and to send the transactions that are to be processed by other nodes to these other nodes. Each of the coherency controllers 102 and 104 may be responsible for processing transactions that relate to a different portion of the local memories 308 and 320 of the node 100. For instance, the coherency controller 102 may be responsible for the even-numbered memory lines, or addresses, of the memories 308 and 320, whereas the coherency controller 104 may be responsible for the odd-numbered memory lines, or addresses, of the memories 308 and 320.

More generally, the controllers 102 and 104 are each responsible for one-half of the memory addresses, or lines, within the memories 308 and 320. Where there are n coherency controllers, each coherency controller is responsible for 1/n of the memory addresses, or lines, within the memories 308 and 320, on an interleaved or other basis. Furthermore, the controllers 102 and 104 are each responsible for one half of the total memory addresses within a multi-node system of which the node 100 is apart, including the addresses within the local memories 308 and 320, and well as the addresses within the remote memories of the other nodes of the multi-node system. More generally, where there are n coherency controllers, each coherency controller is responsible for 1/n of the memory addresses within the total memory of the multi-node system, including the local memories 308 and 320, and the remote memories of the other nodes of the system.

When one of the sub-nodes 302 and 304 generates a transaction, such as by one of the processors 306 and 318, the coherency controller 102 or 104 that is responsible for the memory address to which the transaction relates processes the transaction. For example, the sub-node 302 may generate a transaction that relates to a memory address of the memory 320 for which the coherency controller 104 is responsible. The coherency controller 104 therefore processes this transaction, even though the memory address is within a memory, the memory 320, which is part of a different sub-node, the sub-node 304, than the sub-node 302 that generated the transaction.

Therefore, for any given transaction, only one of the coherency controllers 102 and 104 processes the transaction within the node 100, and the coherency controllers 102 and 104 never have to send transactions among themselves. This is because each of the coherency controllers 102 and 104 is connected to both of the sub-nodes 302 and 304. For instance, the controller 102 is connected to the sub-node 304 via the interconnect 156, and specifically to the memory controller 326 of the sub-node 304, and is connected to the sub-node 302 via the interconnect 150, and specifically to the memory controller 314 of the sub-node 302. Similarly, the controller 104 is connected to the sub-node 304 via the interconnect 152, and specifically to the memory controller 326 of the sub-node 304, and is connected to the sub-node 302 via the interconnect 154, and specifically to the memory controller 314 of the sub-node 302.

As has been indicated, the coherency controllers 102 and 104 are shared by the sub-nodes 302 and 304 of the node 100. Even if the division of the memories 308 and 320 is such that each of the controllers 102 and 104 is responsible for the memory of a single sub-node within the node 100—for example, the controller 102 being responsible for the memory 308 and the controller 104 being responsible for the memory 320—the controllers are still shared by both of the sub-nodes 302 and 304. This is because there are direct connections between each of the sub-nodes 302 and 304 and each of the controllers 102 and 104. For instance, in the embodiment of FIG. 1, each of the memory controllers 314 and 326 of the nodes 302 and 304, respectively, is directly connected to each of the coherency controllers 102 and 104, via the interconnects 150, 152, 154, and 156, as have been described.

Each of the sub-nodes 302 and 304 may generate transactions that for purposes of this explanatory description may be classified into one of four different types where there are two sub-nodes within the node 100. To avoid redundancy and to improve clarity, such different types of transactions are described in relation to the sub-node 302. However, those of ordinary skill within the art can appreciate that these types of transactions are also applicable in relation to the sub-node 304.

First, the sub-node 302 may generate transactions that relate to the memory 308. The memory 308 is local to the sub-node 302, as well as local to the node 100 of which the sub-node 302 is a part. In such a case, either the coherency controller 102 or the coherency controller 104 receives the transaction directly from the sub-node 302 and processes the transaction, depending on which of the controllers 102 and 104 is responsible for the memory line of the memory 308 to which the transaction relates. That is, at no time does the coherency controller 104 receive the transaction from the sub-node 302 if the coherency controller 102 is responsible for the memory line to which the transaction relates, and vice-versa.

Second, the sub-node 302 may generate transactions that relate to the memory 320. That is, the sub-node 302 may generate transactions that relate to the memory 320 that is part of the sub-node 304. The memory 320 is remote to the sub-node 302 but is still local to the node 100 of which the sub-node 302 is a part. In this case, too, either the coherency controller 102 or the coherency controller 104 receives the transaction directly from the sub-node 302 and processes the transaction, depending on which of the controllers 102 and 104 is responsible for the memory line of the memory 320 to which the transaction relates. That is, at no time does the coherency controller 102 receive the transaction from the sub-node 302 if the coherency controller 104 is responsible for the memory line to which the transaction relates, and vice-versa.

Third, the sub-node 302 may generate transactions that relate to memory that is remote to the node 100, and thus is remote to both of the sub-nodes 302 and 304 that are a part of the node 100, but that can still be processed locally within the node 100. That is, the sub-node 302 may generate transactions that relate to memories or resources of other nodes of a multi-node system of which the node 100 is a part, but that do not require processing by these other nodes and that can instead still be completely processed locally within the node 100. In this case, either the coherency controller 102 or the coherency controller 104 receives the transaction directly from the sub-node 302 and processes the transaction, depending on which of the controllers 102 and 104 is responsible for the memory line of the remote memory to which the transaction relates. As before, at no time does the coherency controller 104 receive the transaction from the sub-node 302 if the coherency controller 102 is responsible for the memory line to which the transaction relates, and vice-versa.

Fourth, the sub-node 302 may generate transactions that relate to memory that is remote to the node 100, and thus is remote to both of the sub-nodes 302 and 304 that are a part of the node 100, and that cannot be processed locally within the node 100. That is, the sub-node 302 may generate transactions that relate to memories or resources of other nodes of a multi-node system of which the node 100 is a part, and that require processing by these other nodes. In this case, either the coherency controller 102 or the coherency controller 104 receives the transaction directly from the sub-node 302, and sends the transaction to its destination (remote) node. The coherency controller that performs these functions depends on which of the controllers 102 and 104 is responsible for the memory line of the remote memory to which the transaction relates, as before. The coherency controller 102 may send transactions to other nodes by default over the interconnect 118, whereas the coherency controller 104 may send transactions to other nodes by default over the interconnect 124. However, at no time does the coherency controller 102 receive the transaction from the sub-node 302 if the coherency controller 104 is responsible for the memory line to which the transaction relates, and vice-versa.

Thus, because the coherency controllers 102 and 104 are shared by both of sub-nodes 302 and 304 of node 100, for any given transaction generated within the sub-nodes 302, and 304, the transaction is processed, or sent, by only one of the coherency controllers 102 and 104. The coherency controllers 102 and 104 always receive transactions from the sub-nodes 302 and 304 that relate to memory addresses, or memory lines, for which they are responsible. This reduces processing and transmission latency, because one and only one coherency controller within the node 100 processes or transmits a transaction generated by the sub-node 302 or the sub-node 304. Thus, the coherency controllers 102 and 104 never have to transfer transactions between themselves because they are shared between the sub-nodes 302 and 304.

System and Detailed Node

Figure 2:
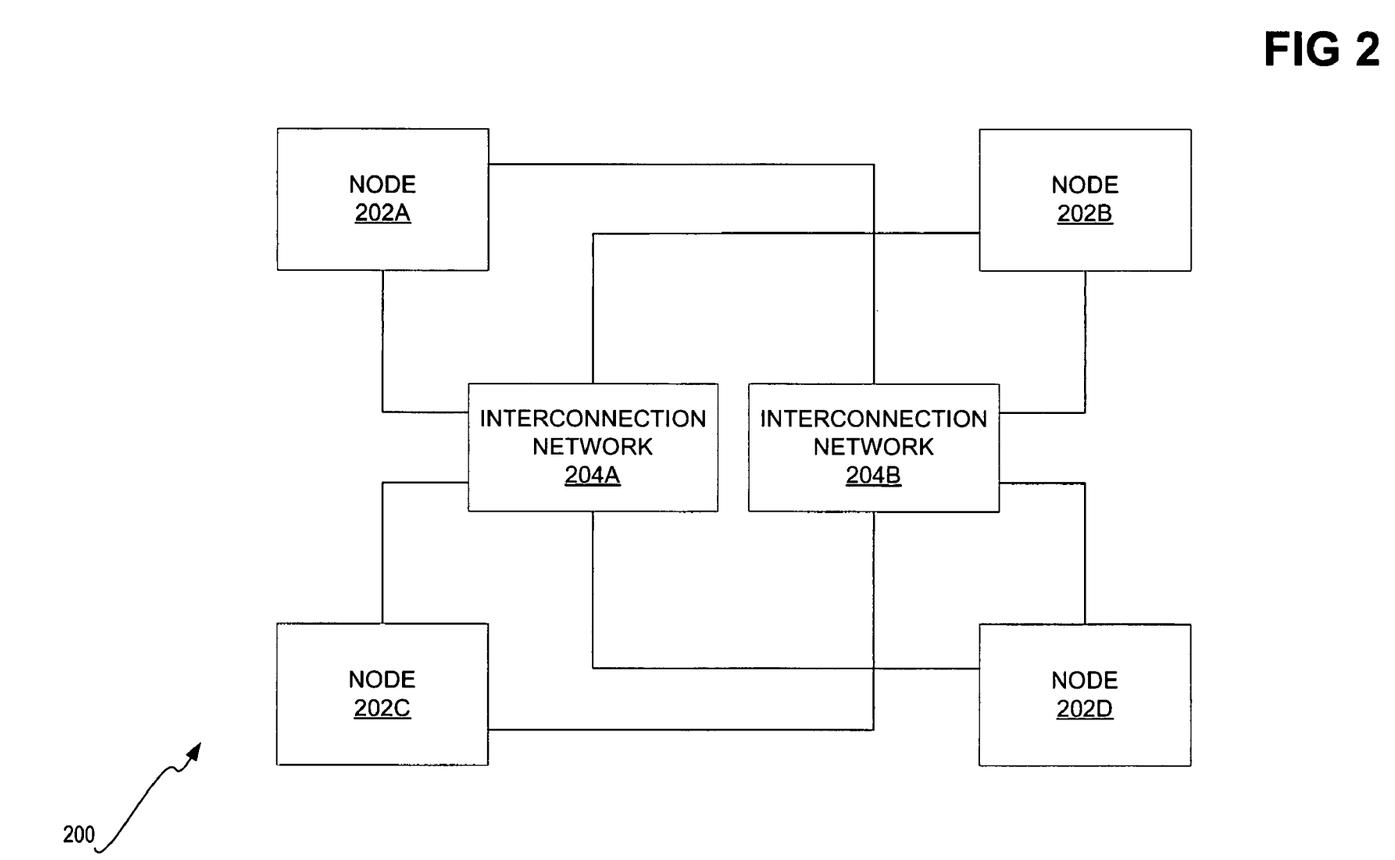
FIG. 2 is a diagram of a system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. Each of the nodes 202 may be implemented in part as the node 100 of FIG. 1 that has been described. The nodes 202 are connected with one another through two interconnection networks 204A and 204B, which are collectively referred to as the interconnection networks 204. Each of the nodes 202 has a separate and independent interconnect to each of the interconnection networks 204, such that each of the nodes 202 has two separate and independent paths to the other of the nodes 202. Each of the nodes 202 may include a number of processors and memories. The memory of a given node is local to the processors of the node, and is remote to the processors of the other nodes. Thus, the system 200 can implement a Non-Uniform Memory Architecture (NUMA) in one embodiment of the invention.

Figure 3:
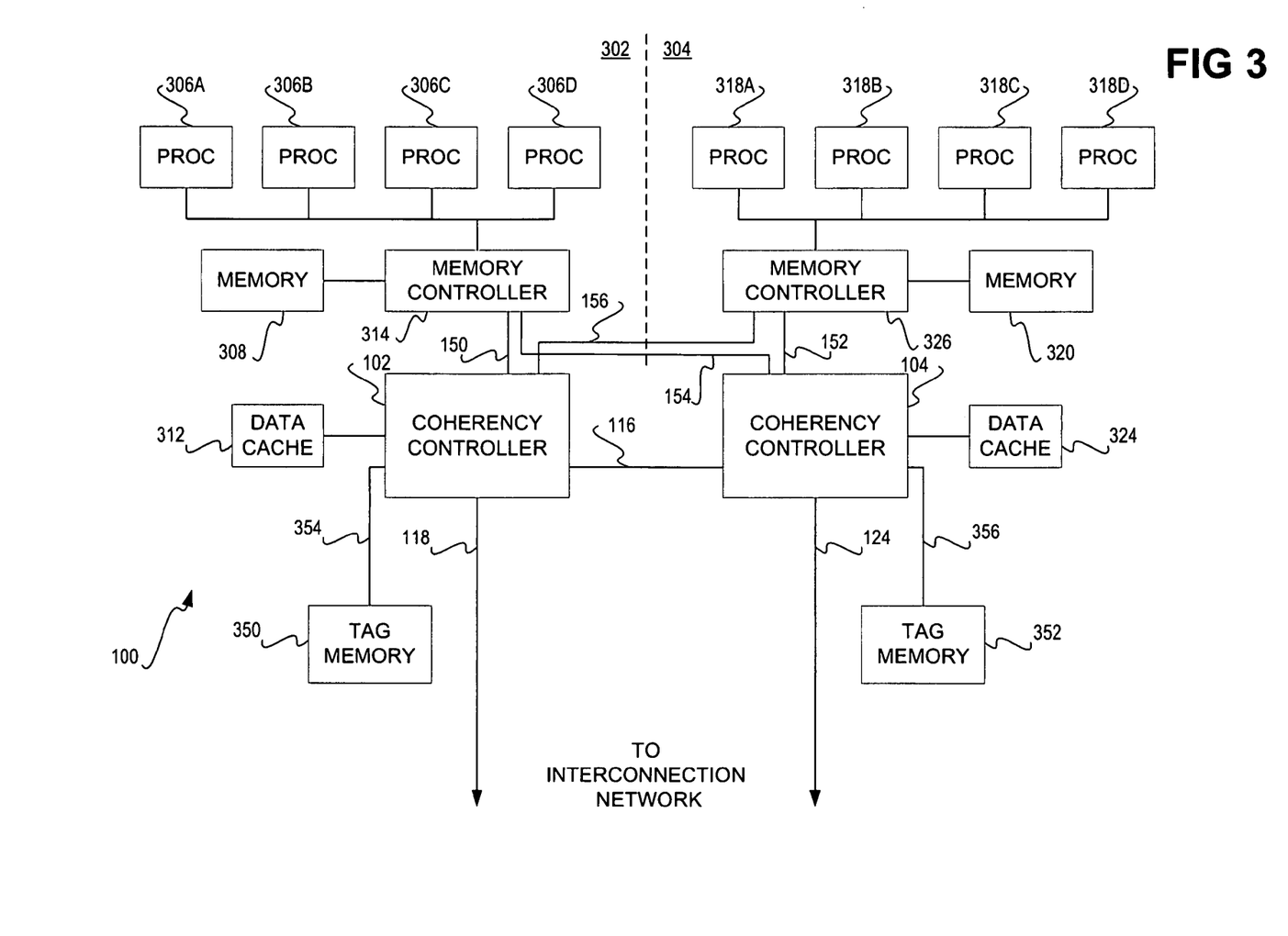
FIG. 3 is a diagram of one of the nodes of the system of FIG. 2 in more detail, according to an embodiment of the invention.

FIG. 3 shows in more detail the node 100, according to an embodiment of the invention that can implement one or more of the nodes 202 of FIG. 2. As can be appreciated by those of ordinary skill within the art, only those components needed to implement one embodiment of the invention are shown in FIG. 3, and the node 100 may include other components as well. The node 100 is divided into a first sub-node 302 and a second sub-node 304, which may also be referred to as logical nodes, whereas the node 100 may also be referred to as a physical node divided into two logical nodes. The sub-node 302 has four processors 306A, 306B, 306C, and 306D, collectively referred to as the processors 306, whereas the sub-node 304 has four processors 318A, 318B, 318C, and 318D, collectively referred to as the processors 318.

The sub-node 302 has a memory 308, whereas the sub-node 304 has a memory 320. The memories 308 and 320 represent an amount of memory local to the node 100 that is divided into the two memories 308 and 320. The memories 308 and 320 may include Random Access Memory (RAM). The memories 308 and 320 may be divided in a number of different ways. For instance, the memory 308 may have odd memory lines associated with it, whereas the memory 320 may have the even memory lines associated with it. As another example, the memory 308 may have the first half of the memory lines, whereas the memory 320 may have the second half of the memory lines.

The coherency controllers 102 and 104 are not part of either of the sub-nodes 302 and 304, but rather are shared by both of the sub-nodes 302 and 304. The coherency controller 102 may manage requests and responses for half of the total memory space within the multi-node system of which the node 100 is a part, whereas the coherency controller 104 may manage requests and responses for the other half of the total memory space within the multi-node system of which the node 100 is a part. Each of the controllers 102 and 104 may be an Application-Specific Integrated Circuit (ASIC) in one embodiment, as well as another combination of software and hardware. The controllers 102 and 104 also have data caches 312 and 324, respectively, for storing data for transactions that relate to the remote memories, which are the local memory of the nodes other than the node 100. Stated another way, the memories 308 and 320 are local to the node 100, and are remote to nodes other than the node 100.

Requests and responses are types of transactions. Requests, for instance, may ask that a given memory address or addresses be read from or written to, whereas responses may indicate that such requests have or have not been performed. The controllers 102 and 104 process transactions themselves that do not require processing by other nodes, and send transactions that do require processing by other nodes to the interconnect. Controllers 102 and 104 may process transactions that relate to their respective portions of the total memory space.

A memory controller 314 specifically interfaces the memory 308, the processors 306, with coherency controller 102 and 104, and a memory controller 326 specifically interfaces the memory 320, and the processors 318, with coherency controller 104 and 102. The coherency controller 102 is able to communicate directly with the coherency controller 104 via the communications link represented by the line 116. Similarly, the coherency controller 104 is able to communicate directly with the coherency controller 102 via the link represented by the line 116.

In operation, the memory controller 314 sends transactions received from the processors 306 for which the coherency controller 102 is responsible to the controller 102, as represented by the line 150, and transactions for which the coherency controller 104 is responsible to the controller 104, as represented by the line 154. Likewise, the memory controller 326 sends transactions received from the processors 318 for which the coherency controller 102 is responsible to the controller 102, as represented by the line 152, and transactions for which the coherency controller 104 is responsible to the controller 104, as represented by the line 156. Transactions that require processing by other nodes are sent to the other nodes via the interconnect by the coherency controllers 102 and 104.

Tag memories 350 and 352 exist for the data caches 312 and 324, respectively, as well as for the data cached by the processors 306 and 318, respectively. The controller 102 accesses the tag memory 350 via the tag bus 354, whereas the controller 104 accesses the tag memory 352 via the tag bus 356. The tag memories 350 and 352 store information relating to the portion of the total memory space processed by coherency controllers 102 and 104 respectively. Caches 312 and 324 store cache line data relating to the remote memory space processed by coherency controller 102 and 104 respectively. The tag memories 350 and 352, as well as the caches 312 and 324, may be external to the controllers 102 and 104. The controllers 102 and 104 utilize the information in the tag memories 350 and 352 to determine whether a transaction relating to a given memory address can be completely processed locally, via one and only one of the coherency controllers 102 and 104, or whether the transaction requires processing by other nodes.

Method

Figure 4:
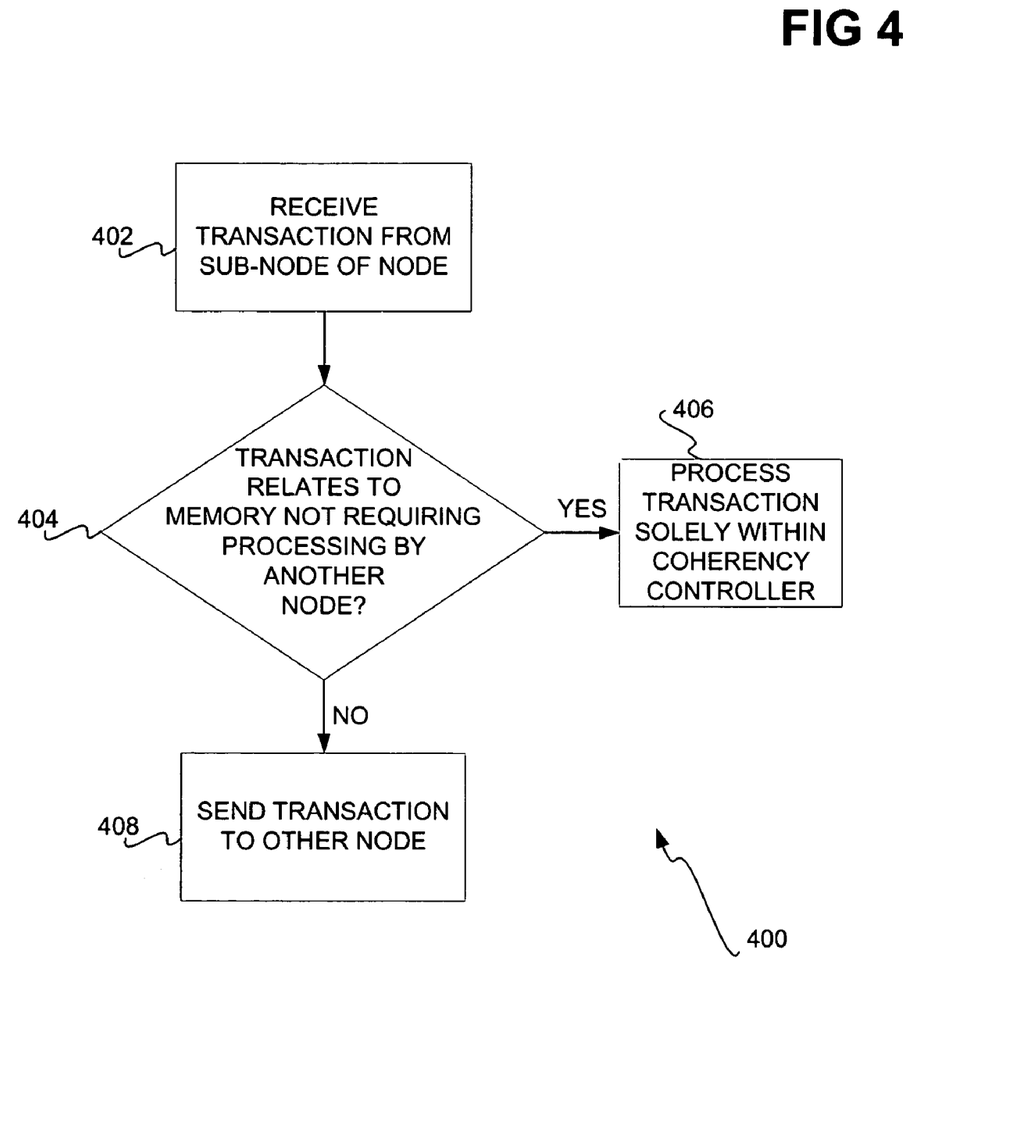
FIG. 4 is a flowchart of a method for handling a transaction by a memory controller of a node, according to an embodiment of the invention.

FIG. 4 shows a method 400, according to an embodiment of the invention. The method 400 is performed by one of the coherency controllers shared by the sub-nodes of a node, which may or may not be part of a multiple-node system. For example, the coherency controllers 102 and 104 of the node 100 of FIGS. 1 and 3 can perform the method 400 in one embodiment of the invention. That is, in one embodiment, the method 400 is performed by each of a number of coherency controllers of a node. Furthermore, the functionality performed by the method 400 can be implemented as means within a computer-readable medium that may be part of a coherency controller of a node of a multiple-node system. The computer-readable medium may be a data storage medium, for instance.

The coherency controller performing the method 400 initially receives a transaction from a processor of a sub-node of the node of which this coherency controller is a part (402). The transaction may be a request or a response. The transaction may relate to the local memory of the node, or remote memory that is the local memory of another node of the system. More specifically, the transaction may relate to another sub-node that is different than the sub-node from which the coherency controller received the transaction. Alternatively, the transaction may relate to the same sub-node from which the controller received the transaction. The transaction may also relate to another node that is different than the node of which the sub-node that sent the transaction is a part. In each of these cases, the transaction may be able to be locally processed within the node of which this sub-node is a part, or may have to be processed by the node to which the transaction relates.

The coherency controller thus determines whether the transaction relates to memory not requiring processing by another node (404). If not, the coherency controller processes the transaction without the aid of any other coherency controller (406), processing the transaction solely within itself, without having to send the transaction to any other coherency controller within the node, or in any other node. Such transactions may include those relating to local memory for which the coherency controller performing the method 400 is responsible, or remote memory for which this controller is responsible where the transaction does not need to be processed by other nodes.

However, if the transaction relates to remote memory and requires processing by another node, then the coherency controller sends the transaction to this other node (408). The transaction is sent to this other node without having to involve any other coherency controller of the node of which the coherency controller performing the method 400 is a part. The transaction may be sent to an interconnection network that connects all the nodes within a multi-node system together.

Thus, notably, the coherency controller never has to send transactions it receives, regardless of whether the transactions relate to local or remote memory, to any other coherency controller within the same node. This is because the coherency controllers of the node are shared among the sub-nodes of the node. Therefore, a given sub-node can send transactions to the appropriate coherency controller, as opposed to, for instance, a coherency controller that is specific to the sub-node, which would then disadvantageously require the controller to sometimes send the transactions to other coherency controllers within the same node. By ensuring that within a given node only one coherency controller receives, processes, and/or sends each transaction, latency is reduced.

Advantages over the Prior Art

Embodiments of the invention allow for advantages over the prior art. The coherency controllers of a node that includes a number of sub-nodes have sufficient capability to determine which transactions can be processed locally and which transactions must be processed by other nodes and processes such transactions with one and only one coherency controller within the node. That is, a transaction is processed by just one coherency controller local to a given physical node. This results in processing latency resulting from just one coherency controller, for transactions that are generated within the physical node and that do not require processing by other nodes. This is accomplished by the multiple coherency controllers of a given physical node being shared by all the sub-nodes, or logical nodes, of the physical node, such that a specific coherency controller of the physical node handles each transaction generated by any sub-node of the physical node.

Allowing a physical node with two or more sub-nodes to process transactions that relate to local memory in one pass, rather than having a first pass for the sending sub-node and a second pass for the receiving sub-node as in the prior art, provides for reduced latency and lower resource utilization when a transaction relates to memory that is local to the physical node but not the logical node. Thus, there are n coherency controllers where each is responsible for 1/n of the total memory space, such that any state associated with a memory address can be checked for all of the sub-nodes within the physical node in one pass through the appropriate coherency controller. This is also more optimal than the prior art's utilizing a single coherency controller for all of the sub-nodes within the physical node, which may be able to check the state associated with a memory address for all of the sub-nodes of the physical node. This would require greater resources and bandwidth within the coherency controller, and thus impact design integration and latency.

Furthermore, where each of n local coherency controllers within a given physical node is responsible for 1/n of the total memory space, inclusive of local memory of the physical node as well as remote memory, embodiments of the invention also provide performance benefits for transactions to remote memory that are held locally in states that do not require processing by remote nodes. Since there is a single shared coherency controller local to the physical node that is responsible for any given remote address, such transactions are process by just one coherency controller local to the physical node, incurring processing latency resulting from just one coherency controller. Such performance benefits are in addition to the performance benefits provided for transactions to memory that is local to the physical node but not local to the sub-node of the physical node.

Alternative Embodiments

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a NUMA architecture. However, the invention is amenable to implementation in conjunction with systems having other architectures as well.

As another example, a node of a multiple-node system has been described as having two sub-nodes, where each sub-node has processors, memory, and a memory controller. However, where a node is divided into sub-nodes, it may have more than two sub-nodes as well. For instance, there may be three or more sub-nodes, each sub-node having processors, memory, and a memory controller that function as has been described herein. Accordingly, the scope of protection of this invention is limited only by the following claims and their equivalents.

I claim:

1. A method for performance by a coherency controller of a plurality of coherency controllers of a node having a plurality of sub-nodes, comprising:

receiving by the coherency controller a transaction from one sub-node of the plurality of sub-nodes, the transaction relating to another sub-node of the plurality of sub-nodes; and, processing the transaction by the coherency controller without having to send the transaction to another coherency controller of the plurality of coherency controllers.

2. The method of claim 1, further comprising:

receiving by the coherency controller a second transaction from the one sub-node of the plurality of sub-nodes, the transaction relating to the one sub-node; and, processing the transaction by the coherency controller.

3. The method of claim 1, further comprising:

receiving by the coherency controller a second transaction from the one sub-node of the plurality of sub-nodes, the transaction relating to another node different than the node of which the one sub-node is a part but able to be processed within the node without having to send the transaction to the other node; and, processing the transaction by the coherency controller without having to send the transaction to another coherency controller of the plurality of coherency controllers.

4. The method of claim 1, further comprising:

receiving by the coherency controller a second transaction from the one sub-node of the plurality of sub-nodes, the transaction relating to another node different than the node of which the one sub-node is a part and unable to be processed within the node;

sending the transaction to the other node through an interconnect connecting the node with the other node.

5. A node comprising:

a plurality of sub-nodes; and, a plurality of coherency controllers shared among the plurality of sub-nodes, wherein each coherency controller is able to process transactions received from the plurality of sub-nodes without having to send the transactions to other of the plurality of coherency controllers where the transactions relate to different sub-nodes of the plurality of sub-nodes as compared to sub-nodes of the plurality of sub-nodes that generated the transactions.

6. The node of claim 5, wherein the plurality of sub-nodes comprises two sub-nodes, and the plurality of coherency controllers comprises two coherency controllers shared between the two sub-nodes.

7. The node of claim 5, wherein each sub-node further comprises:

a processor;

local memory associated with the processor; and, a memory controller to send transactions from the processor to the plurality of coherency controllers.

8. The node of claim 7, wherein each memory controller is directly connected to each coherency controller.

9. The node of claim 5, wherein the plurality of sub-nodes comprises local resources divided among the sub-nodes, and there are n of the plurality of coherency controllers, such that each coherency controller is responsible for processing transactions relating to 1/n of the local resources.

10. The node of claim 9, wherein the local resources comprises memory.

11. A system comprising:

at least one interconnect; and, a plurality of nodes connected to one another via the at least one interconnect, each node comprising:

a plurality of sub-nodes sharing a common resource;

a plurality of coherency controllers shared among the plurality of sub-nodes to process transactions received at least from the plurality of sub-nodes of the node, wherein each coherency controller of each node is able to process the transactions without having to send the transactions to other of the plurality of coherency controllers, where the transactions relate to sub-nodes other than the sub-nodes that generated the transactions.

12. The system of claim 11, wherein the at least one interconnect comprises a plurality of interconnects, each interconnect independently and separately connecting the plurality of nodes to one another.

13. The system of claim 11, wherein the plurality of sub-nodes of each node comprises a first sub-node and a second sub-node.

14. The system of claim 11, wherein each sub-node comprises a memory controller connecting the at least one processor of the sub-node to the plurality of coherency controllers.

15. The system of claim 11, wherein the plurality of resources of each node comprises memory.

16. The system of claim 11, wherein the plurality of coherency controllers of each node comprises a first coherency controller and a second coherency controller.

17. The system of claim 11, wherein each coherency controller of each node comprises an Application-Specific Integrated Circuit (ASIC).

* * * * *